United States Patent [19]

Isner et al.

[11] 4,429,014
[45] Jan. 31, 1984

[54] LAMINATED WIPER

[75] Inventors: William G. Isner, Media, Pa.; John C. Smoyer, Wilmington, Del.

[73] Assignee: Scott Paper Company, Philadelphia, Pa.

[21] Appl. No.: 399,144

[22] Filed: Jul. 16, 1982

[51] Int. Cl.³ ............................................. B32B 3/28
[52] U.S. Cl. ................. 428/152; 15/209 R; 156/221; 156/291; 156/324; 162/112; 428/156; 428/171; 428/198; 428/284; 428/287; 428/298; 428/537; 428/913
[58] Field of Search ............... 428/195, 211, 212, 218, 428/284, 297, 298, 302, 303, 369, 370, 371, 535, 198, 537, 152, 153, 154, 156, 171, 287; 156/221, 291, 324; 15/209 R; 162/112

[56] References Cited
U.S. PATENT DOCUMENTS

| | | | |
|---|---|---|---|
| 2,834,809 | 5/1958 | Schutte et al. | 428/179 |
| 3,709,764 | 1/1973 | Thomas | 156/177 |
| 3,862,877 | 1/1975 | Camden | 428/111 |
| 3,879,257 | 4/1975 | Gentile et al. | 162/112 |
| 3,953,638 | 4/1976 | Hemp | 156/291 |
| 3,965,518 | 6/1976 | Muoio | 428/198 |
| 3,965,519 | 6/1976 | Hermann | 428/198 |
| 4,001,472 | 1/1977 | Thomas et al. | 428/198 |
| 4,239,792 | 12/1980 | Ludwa | 428/287 |
| 4,326,000 | 4/1982 | Roberts | 428/198 |

Primary Examiner—James J. Bell
Attorney, Agent, or Firm—Joseph H. Yamaoka; John W. Kane

[57] ABSTRACT

A multi-layered wiper and method of making it, the wiper having at least one strong surface region of fibers having a predominate length of less than one-fourth inch and having bonding material disposed therein in a fine spaced apart pattern, the areas in the strong surface region where the bonding material is disposed being finely creped and at least one inner core region of fibers having a predominate length of less than one-fourth inch and generally having less fiber concentration than the surface region, and at least one interior strong region of fibers having a predominate length of less than one-fourth inch and having a greater fiber concentration than in the inner core region and having bonding material disposed therein in a fine spaced apart pattern to bond the fibers in the interior strong region together into a strong network, the bonding material in the interior strong region being substantially unconnected to the bonding material in the strong surface region and a strengthening layer comprising a web of fibrous material having a minimum wet tensile strength of about 16 ounces per inch measured in any direction, and being substantially free of apertures larger than 0.02 square inches, said strengthening layer being bonded to the exterior surface of one of the interior strong regions.

27 Claims, 6 Drawing Figures

LAMINATED WIPER

TECHNICAL FIELD

This invention relates generally to disposable laminated web structures, and methods of making said structures, suitable for use as a substitute for cloth shop towels. More particularly, this invention relates to a laminated web structure in which a very light, relatively strong reinforcing web is adhesively bonded to either one or two fibrous webs made from predominately papermaking fibers.

BACKGROUND OF THE INVENTION

The prior art discloses that fibrous webs, made predominately of papermaking fibers, can be reinforced to make a laminated web structure suitable for use as a heavy duty wiper. This is generally accomplished by adhering a reinforcing layer to one or more plies of uniform density webs, such as tissue.

One prior art laminated structure using tissue layers is disclosed in U.S. Pat. No. 3,862,877—Camden comprising three layers of tissues and in which a large quantity of particular soft, tacky, nonmigratory binder solids is impregnated in a centrally located tissue which is faced with additional outer tissue layers.

U.S. Pat. No. 3,709,764—Thomas disclosed a laminated wiper in which one or more plies of cellulosic tissue layers are placed between outer scrim layers.

U.S. Pat. No. 3,953,638—Kemp discloses a laminated wiper structure which includes a relatively inextensible central ply of cellulosic tissue paper which is reinforced by imprinting an intermittent pattern of a suitable polymer resin on each surface. The outer plies of the wiper are highly extensible creped cellulosic tissue paper which are intermittently adhered to the surface of the reinforced central ply.

U.S. Pat. No. 3,879,257—Gentile et al, assigned to the assignee of this invention, discloses a single-ply fibrous web that has a laminate-like structure which consists of a soft, absorbent central core region of relatively low fiber concentration sandwiched between two strong, abrasion resistant surface regions of higher fiber concentration. The surface regions have bonding material therein to provide strength and the bonded areas in at least one of the surface regions is finely creped. The Gentile, et al. patent also discloses a method of making a laminate-like web from an already formed fibrous web, the method, including the steps of applying to one side of the web bonding material which penetrates from about 10 to about 60 percent through the thickness of the web, applying to the other side of the web bonding material in a fine spaced apart pattern which penetrates from about 10 to about 60 percent through the thickness of the web but which does not substantially connect with the first bonding material, adhering said other side of the web to a creping surface by means of the bonding material, and creping the web from the creping surface.

It is also known in the prior art to form a laminated web structure by laminating a stranded scrim in between two fibrous webs made in accordance with the above-mentioned Gentile, et al. patent. The spacing of the scrim strands results in apertures of about 0.079 square inches in the scrim. Applicants have found that these relatively large nonreinforced areas make the laminated structure unsuitable as a heavy duty wiper because the relatively large nonreinforced areas are susceptible to punctures and do not provide acceptable abrasion resistance over the entire surface of the wiper.

U.S. Pat. No. 2,834,809—Schutte et al. describes a method, known as perf-embossing, of mechanically working fibrous webs to make them more absorbent and conformable. In the method of Schutte et al., the web is passed through the nip of two rolls, the surface of each roll comprised of a plurality of projections and depressions so arranged that the projections of each roll mates with corresponding depressions in the other roll. As the fibrous web passes through the nip of the two rolls portions of the web are compressed while portions of the web between the compressed areas are stretched beyond the elastic limit of the fibers or interfiber bonds which causes the fibers to separate which increase the porosity of the web. In some cases the tensile strength of the paper is exceeded resulting in apertures being formed in the web. Schutte, et al recognize that multi-ply webs can be mechanically worked by their process.

SUMMARY OF THE INVENTION

In accordance with this invention, there is provided a multi-layered wiper having a strong surface region of fibers having a predominate length of less than one-fourth inch and having bonding material disposed therein in a fine spaced apart pattern, the areas in the strong surface region where the bonding material is disposed being finely creped. The wiper also has an inner core region of fibers having a predominate length of less than one-fourth inch and having less fiber concentration than in the surface region. The wiper has a second strong region of fibers having a predominate length of less than one-fourth inch and having a greater fiber concentration than in the inner core region and having bonding material disposed therein in a fine spaced apart pattern to bond the fibers in the second strong region together into a strong network, the bonding material in the second strong region being substantially unconnected to the bonding material in the strong surface region. The wiper is reinforced by a strengthening layer comprising a web of fibrous material having a minimum wet tensile strength of about 16 ounces per inch measured in any direction, and being substantially free of apertures larger than 0.02 square inches, the strengthening layer being bonded to the exterior surface of the second strong region.

In another aspect of the invention, the wiper can further have a third strong region of fibers having a predominate length of less than one-fourth inch and having bonding material disposed therein in a fine spaced apart pattern to bind the fibers in the third strong region together into a strong network; a second inner core region of fibers having a predominate length of less than one-fourth inch and generally having less fiber concentration than the third strong region; and a second strong surface region of fibers having a predominate length of less than one-fourth inch and having bonding disposed therein in a fine spaced apart pattern, the areas in the strong surface region where the bonding material is disposed being finely creped, and the bonding material in the second strong surface region being generally unconnected to the bonding material in the third strong region of fibers, and many of the fibers in the second core region adjacent to the second strong surface region and the third strong region being tied into fibers in said second strong surface region or third strong region by either papermaking bonds or bonding material.

In yet another aspect of the invention the wiper can also have a second strengthening layer comprising a web of fibrous material having a minimum wet tensile strength of about 16 ounces per inch measured in any direction, and being substantially free of apertures layer than 0.02 square inches, said strengthening layer being bonded to the exterior surface of the first strong region.

In accordance with the method of this invention, a multi-layered wiper is made by (a) applying bonding material to one side of a web of fiber having a predominate length of less than one-fourth inch which penetrates from about 10 to about 60 percent through the web; (b) applying bonding material to the other side of the web in a fine, spaced apart pattern which covers about 15 to about 60 percent of the surface area and which penetrates to about 10 percent to about 60 percent through the thickness of the web and which does not substantially interconnect with the bonding material in the one side; (c) adhering the bonded protions of the other side of the web to a creping surface and creping the web from the creping surface; and (d) adhering a reinforcing web of fibrous material having a minimum wet tensile strength of about 16 ounces per inch measured in any direction and being substantially free of apertures larger than 0.02 square inches, to the surface of said one side of the web.

In another aspect of the invention a multi-layered wiper can be made by adhering a second reinforcing web of fibrous material having a minimum wet tensile strength of about 16 ounces per inch measured in any direction and being substantially free of apertures larger than 0.02 square inches, to the surface of the other side of the web.

In yet another aspect of the invention, a multi-layered wiper can be made by additionally repeating steps (a) (b) and (c) on a second web of fibers having a predominate length of less than one-fourth inch; and, adhering said one side of the second web to the reinforcing web.

BEST MODE FOR CARRYING OUT THE INVENTION

Figure 1:
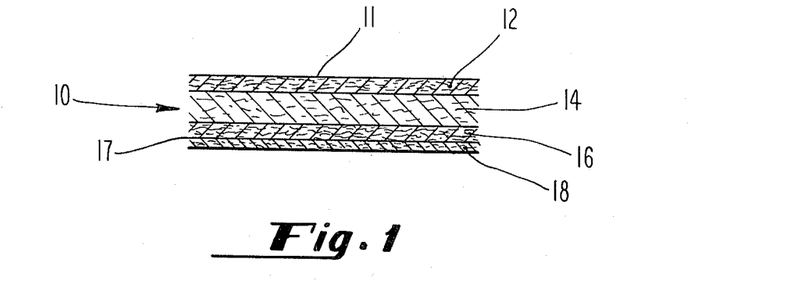
FIG. 1 is a cross-sectional schematic view of one laminated web structure.

FIG. 1 depicts in schematic form a cross sectional view of a multilayer web structure 10 made in accordance with this invention. The web 10 is comprised of a surface fibrous layer 12, an interior fibrous layer 14 adjacent to the surface layer 12, a second interior fibrous layer 16 adjacent the interior layer 14 and a fibrous reinforcing layer 18 adjacent interior layer 16. The surface fibrous layer 12 has been strengthened by the application of adhesive bonding material in a fine, spaced apart pattern to the surface 11 of the layer 12. The interior layer 14 consists of fibers loosely held together by papermaking bonds. The density of the fibers in the interior layer 14 is generally less than the density of the fibers in the strengthened surface layer 12. Many of the fibers in the interior layer 14 adjacent to the strengthened surface layer 12 are tied into fibers in the surface layer 12 either by papermaking bonds or by the adhesive bonding material in the surface layer 12 thereby providing integrity between layers 12 and 14. The interior fibrous layer 16 is also strengthened by the application of adhesive bonding material in a fine, spaced apart pattern to the surface 17 of the layer 16. The density of the fibers in the strengthened layer 16 is generally greater than the density of the fibers in the interior layer 14. Many of the fibers in the interior layer 14 adjacent to the strengthened layer 16 are tied into fibers in the surface layer 12 either by papermaking bonds or by the adhesive bonding material in the strengthened layer 16 thereby providing integrity between the layers 14 and 16. The reinforcing layer 18 is adhered to the surface 17 of the strengthened layer 16 by any appropriate means such as adhesive bonding material. In a preferred embodiment, the bonding material in either the surface 11 of layer 12 or in the surface 17 of layer 16 is softened by finely creping the surface. In the most preferred embodiment, the bonding material in both surfaces 11 and 17 are finely creped.

In the web structure of FIG. 1, the strengthened surface layer of fibers 12 combined with the less dense interior layer 14 combine to give the web 10 a balance of good abrasion resistance along with absorbency and softness. Because the bonding material in the reinforced surface layer 12 is applied in a fine, spaced apart pattern there may be some tendency for linting to occur when that surface is used for wiping. In those cases where the reinforcing layer 18, in addition to providing the web 10 with overall strength and resistance to punctures also provides that surface of web 10 with high abrasion resistance without linting although at reduced absorbency.

Figure 2:
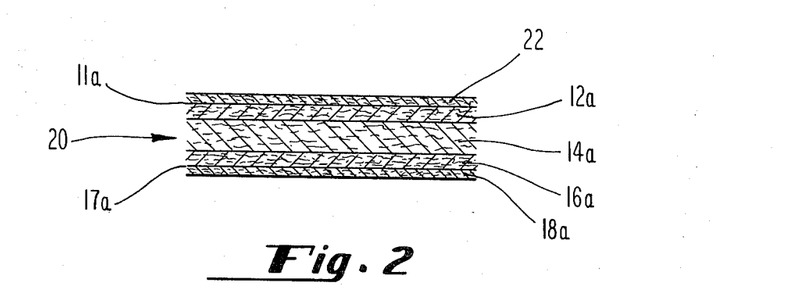
FIG. 2 is a cross-sectional schematic view of a second laminated web structure.

FIG. 2 depicts in schematic form a cross-sectional view of another web structure 20 made in accordance with this invention. Layers 12a, 14a, 16a and 18a have the same structure as layers 12, 14, 16 and 18 respectively of FIG. 1. A second reinforcing layer 22 is adhered to the surface 11a of strengthened layer 12a by any appropriate means such as adhesive bonding material.

The web 20 of FIG. 2 has two exterior reinforcing layers, 18a and 22 for those applications where it is desired to have bot surfaces highly resistant yet relatively lint-free. The relatively low density interior fiber region 14a not only contributes to an improved absorbency characteristic of the web but also contributes to a more drapeable web 20 than if that layer were not present.

Figure 3:
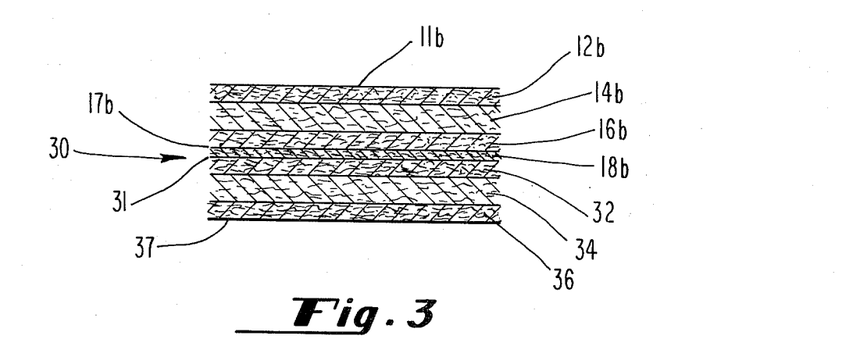
FIG. 3 is a cross-sectional schematic view of a third laminated web structure.

FIG. 3 depicts in schematic form a cross-sectional view of another web structure 30 made in accordance with this invention. Layers 12b, 14b, 16b and 18b have the same structure as layers 12, 14, 16 and 18 of FIG. 1. In addition to the layers 12b, 14b, 16b and 18b, and web 30 includes a third interior fibrous layer 32 adjacent the reinforcing layer 18b, a fourth interior fibrous layer 34 adjacent the layer 32 and a second surface fibrous layer 36 adjacent the layer 34. The surface fibrous layer 36 has also been strengthened by the application of bonding material in a fine, spaced apart pattern to the surface 37 of the layer 36. The interior layer 34 also consists of fibers loosely held together by papermaking bonds.

Like the layer 14b, the density of the fibers in interior layer 34 is generally less than the density of the fibers in the strengthened surface layer 36. Many of the fibers in the interior layer 34 adjacent to the strengthened surface layer 36 are tied into fibers in the surface layer 36 either by papermaking bonds or by the adhesive bonding material used to strengthen the surface layer 36 thereby providing integrity between layers 34 and 36. The interior fibrous layer 32 is also strengthened by the application of adhesive bonding material in a fine, spaced apart pattern to the surface 31 of layer 32. The density of the fibers in the strengthened layer 32 is generally greater than the density of the fibers in the interior layer 34. Many of the fibers in the interior layer 34 adjacent the strengthened layer 32 are also tied into fibers in the strengthened layer 32 either by papermaking bonds or by the adhesive bonding material in the strengthened layer 32 thereby providing integrity between the layers 32 and 34. The surface 31 is adhered to the reinforcing layer 18b by any appropriate means such as adhesive bonding material.

The web 30 of FIG. 3, has two strengthened surface layers 12b, 36 of fibers combined with two less dense, interior layers 14b, 34 to provide web 30 with a balance of abrasion resistance along with absorbency, softness and drapeability. The reinforcing layer 18b provides the web 30 with overall strength and resistance to punctures.

In the preferred embodiments of FIGS. 1-3, all of the fibrous layers except reinforcing layers 18, 18a, 18b and 22 preferably comprise principally lignocellulosic fibers like wood pulp or cotton linters used in papermaking which are short fibers of less than one-fourth inch length. However, the web may be formed with a portion or all of the fibers being relatively longer fibers and still retain advantages of the present invention. Examples of such relatively longer fibers are cotton, wool, rayon, regenerated cellulose, cellulose ester fibers such as cellulose acetate fibers, polyamide fibers, acrylic fibers, polyester fibers, vinyl fibers, protein fibers, fluorocarbon fibers, dinitrile fibers, nitrile fibers, and others, natural or synthetic. The length of these other fibers may be up to about 2½ inches long, although shorter lengths are advantageous in forming the web on conventional papermaking equipment. It is particularly advantageous for economic and other reasons to use at least 50 percent papermaking fibers. And it is also particularly advantageous for the fibers to be randomly oriented rather than aligned.

The pattern of bonding material applied to the web can be on either side, and must be on one side, in any form of fine lines or fine areas which leaves a substantial portion of the surface of the web free from bonding material. Preferably, the pattern should be such that the bonding material occupies between about 15 percent and about 60 percent of the total surface area of the web, leaving between about 40 percent and about 85 percent of each surface of the web free from bonding material in the finished web product.

It has been found to be particularly desirable when the web consists principally of papermaking fibers to apply the bonding material in a recticular pattern so the bonding material forms a net-like web of strength through the surface of the web. It is well known that papermaking fibers generally have a length less than about one-fourth inch and normally have a predominant fiber length less than about one-sixteenth of an inch. Therefore, where strength is to be primarily imparted to a sheet by bonding material instead of through interfiber bonds of the type conventionally utilized in papermaking, it is important that there be a continuous interconnection of at least some of the fibers by the bonding material throughout the entire web. If the pattern of bonding material is in the form of parallel lines, bars, or other forms of discrete areas, the web will lack substantial strength unless such discrete areas are spaced apart by distances less than the average fiber lengths. However, when the pattern of adhesive is reticular or net-like in configuration, the interconnected lines of bonding material provide a network of strength even where substantial areas between the lines of bonding material application are defined as unbounded web portions.

The reinforcing layer 18, 18a, 18b and 22 of FIGS. 1, 2, and 3 respectively, is a material that has good drapeability, is strong, and which does not have large open areas devoid of reinforcing fibers. In particular the reinforcing material 18, 18a, 18b and 22 should have a minimum wet (water) tensile strength of about 16 ounces per inch measured in any direction. As a measure of drapeability, the reinforcing layer 18, 18a, 18b and 22 should also have a flexural rigidity, as measured in accordance with ASTM D1388-75, volume 32, in the range of about 10 to about 25. It has also been found that the reinforcing layer 18, 18a, 18b and 22, should not have large open areas. In a preferred embodiment, the reinforcing layer is a randomly deposited spunbonded nonwoven web. One preferred reinforcing material is a spun-bonded nylon web having a basis weight of 0.4 ounces per square yard, and sold under the trademark Cerex, which can be purchased from Monsanto Textile Company, 800 North Lindbergh Boulevard, St. Louis, MO 63166.

Figure 4:
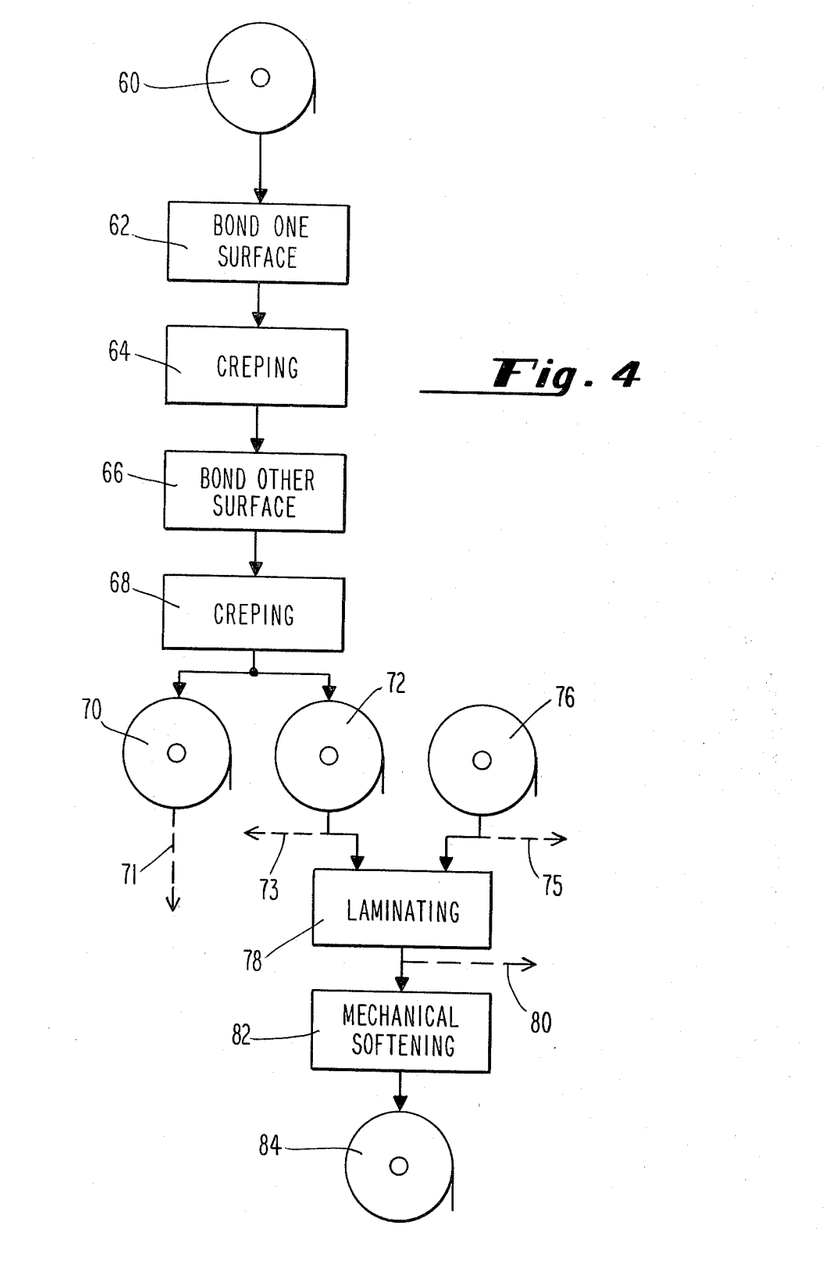
FIG. 4 is a flow diagram in block form of a method to make the web of FIG. 1.

FIG. 4 is a flow diagram of a method of making a wiper illustrated in FIG. 1. As shown in FIG. 4, the process is shown as being initiated by treating a roll of base paper 60 but it will be appreciated by those skilled in the art that the process can also be initiated by treating a web as it is being made on a papermaking machine as described in U.S. Pat. No. 3,879,257—Gentile et al., which is incorporated herein by reference. The base paper 60 is treated in the step of block 62 by applying bonding material in one surface of the web. The bonding material can be applied overall to the surface of the web or, in a preferred method, is applied in a fine, spaced apart pattern to the surface of the web. The penetration of the bonding material into the web is controlled so that it extends from about 10 to about 60 percent through the thickness of the web after the creping step represented as block 68. Following the step 62 of applying bonding material to one surface of web 60, it is preferred to perform the step 64 of adhering the web, by means of the bonding material applied to the one surface of web 60, to a creping surface and creping the web from the creping surface. After bonding material is applied to the one surface, as represented by the step 66, bonding material is applied to the other surface of the web 60. Similar to step 62, the bonding material can be applied overall to the surface of the web or, in a preferred method, is applied in a fine, spaced apart pattern to the surface of the web. The penetration of the bonding into the web is controlled so that it extends from about 10 to about 60 percent through the thickness of the web but is not allowed to substantially interconnect with the bonding material applied during the step 62. After the step 66 of applying bonding material to the other surface of the web 60, it is preferred to perform the step 68 of adhering the web 60, by means of the bonding material applied to the other surface of the web 60, to a creping surface and creping the web from the creping surface.

After the last creping step 68 it may be desirable to wind the treated web 60 into parent rolls 70 and 72 and complete the manufacture of the wiper product at another location. Alternatively, the treated web 60 can proceed directly to the next step 78 which consists of laminating the web 60 to a reinforcing layer, the source of which is indicated by a roll 76. In the laminating step 78 an adhesive formulation consisting of UCAR 878 available from Union Carbide Corporation, 270 Park Avenue, New York, NY 10017, mixed with 6 parts per hundred of rubber Cymel 303, available from American Cyanamid Company, Wayne, NJ 07470, a cross-linking agent. The adhesive is printed onto the surface of the reinforcing layer 76 by means of a gravure roll having a 90 mil by 60 mil diamond pattern (with the long dimension aligned in the machine direction of the web) with lines 0.012 inches wide and 94.3 microns deep. The surface of the reinforcing layer 76 with the adhesive printed thereon is brought in contact with the surface of the web 60 and is then dried for example, by passing the combined web over a Yankee dryer, at a temperature of 300°–325° F. The web is further heated, for example by means of a through air dryer, to a temperature of 430°–450° F. to cure the laminating adhesive. Although the application of the adhesive used to laminate the reinforcing layer 76 to the web 72 was made in a continuous, diamond pattern, it will be clear to those skilled in the art that other patterns of adhesive can be used and in fact, may be more desirable. For example, it is believed that the application of the adhesive in a pattern of discrete spots will result in a web which has better drapeability than a web that has been laminated with a continuous pattern of adhesive. After the laminating step 78, the laminated structure is that depicted generally in FIG. 1.

The laminated wiper structure that results from the laminating step 78 may be relatively stiff as compared to a cloth wiper. If so, the laminated wiper structure is put through a mechanical softening step 82 such as microcreping, embossing, or perf-embossing. The preferred method of mechanical softening step 82 is to perf-emboss the laminated structure in accordance with U.S. Pat. No. 2,834,809—Schutte, et al.

After the mechanical softening step 80, the laminated wiper structure can be wound into parent rolls 84 for later conversion into packages of individual wipers.

Figure 5:
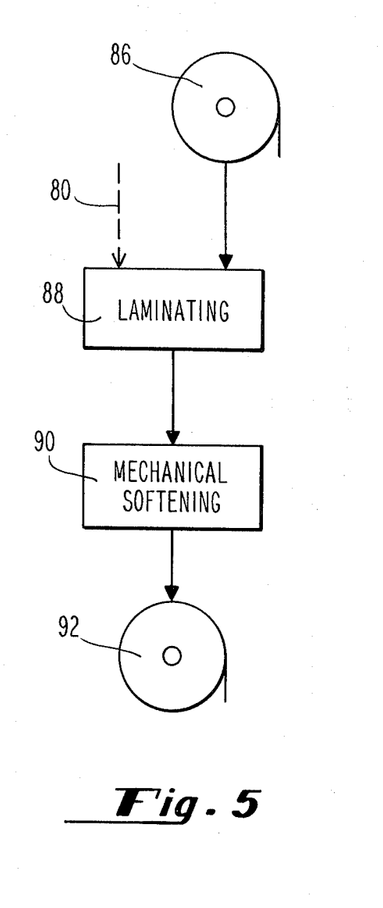
FIG. 5 is a flow diagram in block form of additional steps which when added to some of the steps in the method of FIG. 4 results in the web of FIG. 2.

FIG. 5 is a flow diagram in block form of additional steps which when performed after the laminating step 78 of FIG. 4 results in the laminated wiper of FIG. 2. As indicated by the dashed line 80, the laminated wiper structure resulting from laminating step 78 proceeds to a second laminating step 88 where a second reinforcing web 86 is adhered to the unreinforced surface of the laminated structure produced from laminating step 78. The laminating step 88 is substantially identical to the laminating step 78 of FIG. 4. The laminated web structure that results from laminating step 88 has the structure depicted in FIG. 2. In the preferred method of making the laminated wiper structure of FIG. 2, the laminated web structure is caused to undergo a mechanical softening step 90 which is substantially the same as the mechanical softening step 82 of FIG. 4. The mecahnically softened wiper is wound into a parent roll 92 for later conversion into packages of wipers.

Figure 6:
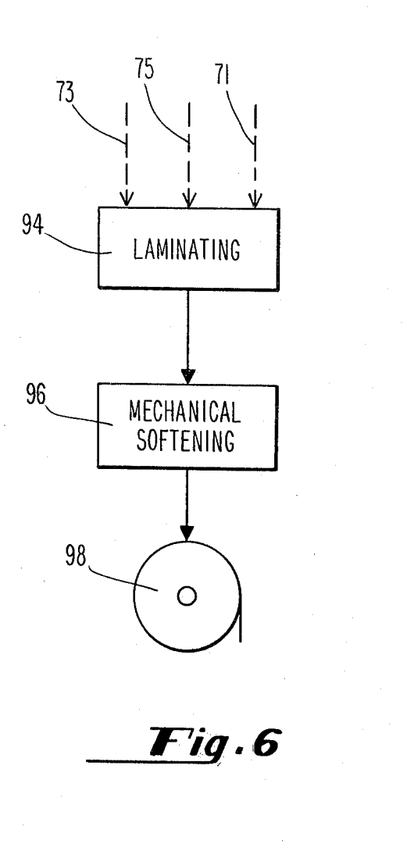
FIG. 6 is a flow diagram in block form of additional steps which when added to some of the steps in the method of FIG. 4 results in the web of FIG. 3.

FIG. 6 is a flow diagram in block form of additional steps, which when performed after the creping step 68 of FIG. 1 results in the laminated wiper of FIG. 3. In a preferred method as indicated by the dashed lines 71, 73, and 75 the webs 70, 72 and 76 are laminated together in a single laminating step 94. This is accomplished by placing the reinforcing web 76 in contact with one surface of the web 72, applying adhesive, as described in the laminating step 78 of FIG. 5, to the surface of the reinforcing web 76 that is not in contact with the web 72, then bringing the second web 70 in contact with the surface of the web 76 that is not in contact with web 72. The laminated web structure is then dried and cured as described in connection with the laminating step 78 of FIG. 4. The laminated web structure that results from laminating step 94 is the structure represented in FIG. 3. It is, however, preferred to perform a mechanical softening step 96, substantially identical to the mechanical softening step of FIG. 4. The mechanically softened laminated wiper can be wound into parent rolls 98 for later conversion into packages of individual wipers.

In the methods generally described in FIGS. 4–6, the mechanical softening steps 82, 90 and 96 have been shown as taking place after the corresponding laminating steps 78, 88 and 94. It is contemplated by Applicants that the mechanical softening steps 82, 90 and 96 can occur immediately after the second creping step 68 of FIG. 1.

During the discussion of FIGS. 4–6 it was also indicated that the mechanical softening steps are optional. As a general guideline, if the flexural rigidity of the wiper after the laminating step is greater than 600, it is desirable to perform the mechanical softening step.

The web structures of FIGS. 1–3 will generally have a finished basis weight as low as 30 pounds per ream of 2880 square feet and as high as 110 pounds per ream with the preferred range being between 65 to 95 pounds per ream.

EXAMPLE I

Example I is a heavy duty wiper having the structure of FIG. 3 and made in accordance with FIGS. 4 and 6.

The base web 60 was conventionally formed on conventional papermaking equipment from a pulp slurry of bleached, northeastern softwood kraft fibers into which was added RYCO 637 to reduce interfiber bonding. The web was adhered to a Yankee dryer and creped therefrom. The nominal physical properties of the base web 60 were as follows:

| Basis Weight | 31.0 pounds per 2880 square feet |
| Bulk | 210 mils per 24 sheets |
| MD Tensile | 17 ounces per inch |
| MD Stretch | 6% |
| CD Tensile | 11 ounces per inch. |

Both surfaces of the base web 60 are bonded and creped in accordance with steps 62, 64, 66 and 68 of FIG. 4. The bonding material applied to the surfaces of the web is a water emulsion of A-105, available from Air Products & Chemical, Inc., P.O. Box 538, Allentown, PA 18105, at 10–18 lbs. per ream of solids, up to 0.5 parts of ammonium chloride per 100 parts of A-105 solids, up to 0.5 parts of Foamaster VF available from Diamond Shamrock Corporation, 350 Mount Kemble Ave., Morristown, NJ 07960 per 100 parts of A-105 solids, and up to 0.5 parts of Natrosol, available from Hercules Corp., Wilmington, DE, per 100 parts of A-105 solids. The bonding material is printed onto the surfaces by means of a gravure roll having a 90 mil by 60 mil diamond pattern, the diamond line width being from 9.4 to 10.8 mils and the line depth being from 68 to 76 microns. After the second creping step 68, the web is laminated to a spunbonded nylon web Cerex, available from Monsanto Textile Co., 800 No. Lindbergh Blvd., St. Louis, MO 63166, having a basis weight of 0.3 ounces per square yard. The adhesive formulation and method of applying it was as described in the explanation of laminating step 78 of FIG. 6. After the wiper structure has been laminated it is perf-embossed in accordance with the aforementioned patent to Schutte, et al. The perf-embossing is accomplished by passing the laminated wiper structure through two rolls having identical knuckle patterns. The cross-section of each knuckle is an elongated (in the machine direction) hexagon having 2 parallel long sides extending 0.052 inches in the machine direction and two pairs of equal, parallel sides 0.021 inches extending in a direction that makes a 45 degree angle with the long sides of the extended hexagon. The knuckles in each roll are aligned in the machine direction with a knuckle-to-knuckle spacing of 0.144 inches while adjacent knuckles are staggered at a 45 degree angle in the cross direction of the roll so that the knuckle-to-knuckle spacing along the line at 45 degrees to the machine direction of the roll is 0.11 inches. The knuckles of the two rolls intermesh so that they overlap to a depth of 0.031 inches.

The resultant laminated wiper has the following characteristics:

|  | Before Softening | After Softening |
| --- | --- | --- |
| Cross Direction Wet Tensile (ounces per inch) | 71.5 | 42.7 |
| Machine Direction Wet Tensile (ounces per inch) | — | 99.2 |
| Total Tear Test (gram-cm) | 537 | 432 |
| Mullen Burst Test, Dry (psi) | 31.6 | 23.5 |
| Flexural Rigidity | 941.2 | 327.5 |
| Taber Abrasion Test, Dry (cycles) | 245 | 106 |
| Basis Weight (pounds per 2880 square feet) | 88.8 | 88.5 |

The Total Tear Procedure is described in TAPPI Procedure T414 tS-65.
The Mullen Burst Test Procedure is described in TAPPI Procedure T403 Os-76.
The Flexural Rigidity is measured in accordance with ASTM Procedure D1388-75 volume 32.
The Taber Abrasion Test is described in ASTM 1175, Rotary platform, double head, section 41.3, one-quarter inch diameter failure point.

EXAMPLE II

Example II is a heavy duty wiper made in the same way as the wiper of Example I except that the reinforcing layer is Cerex spunbonded nylon web having a basis weight of 0.4 ounces per square yard.

The resultant laminated wiper has the following characteristics:

|  | Before Softening | After Softening |
| --- | --- | --- |
| Cross Direction Wet Tensile (ounces per inch) | 74.0 | 54.7 |
| Machine Direction Wet Tensile (ounces per inch) | — | 117.2 |
| Total Tear Test (gram-cm) | 564 | 515.2 |
| Mullen Burst Test, Dry (psi) | 32.5 | 23.5 |
| Flexural Rigidity | 828.3 | 314 |
| Taber Test, Dry (cycles) | 292 | 107 |
| Basis Weight (pounds per 2880 square feet) | 89.9 | 91.2 |

EXAMPLE III

Example III is a heavy duty wiper made in the same way as Example II except for the perf-embossing step in which the knuckle overlap was reduced to 0.011 inches which results in less mechanical softening of the laminated wiper.

The resultant laminated wiper has the following characteristics.

|  | Before Softening | After Softening |
| --- | --- | --- |
| Cross Direction Wet Tensile (ounces per inch) | 74.7 | 67.3 |
| Machine Direction Wet Tensile (ounces per inch) | — | 126 |
| Total Tear Test (gram-cm) | 628 | 572 |
| Mullen Burst Test, Dry (psi) | 31.6 | 34.7 |
| Flexural Rigidity | 1194.6 | 552.9 |
| Taber Test, Dry (cycles) | 269 | 156 |
| Basis Weight (pounds per 2880 square feet) | 91.5 | 91.6 |

EXAMPLE IV

The base sheet for Example IV is made by basically the same process and on the same papermaking machine as the base sheet for Examples I, II, and III except that the basis weight is increased to a nominal 45 pounds per 2880 square feet. The other nominal physical properties of the base web are as follows:

| Bulk | 270 mils per 24 sheets |
| --- | --- |
| MD Tensile | 28 ounces per inch |
| MD Stretch | 6% |
| CD Tensile | 17 ounces per inch |

Both surfaces of the base web material are bonded and creped in the same manner as the base web material for Examples I, II and III except that the line width of the gravure roll pattern is between 9.4 to 11.7 mils and the line depth is between 68 to 94 microns. The bonded and creped base web has a nominal basis weight of 57 pounds per 2880 square feet. After the second creping step, the treated base web material is adhered to a Cerex web having a basis weight of 0.4 ounces per square yard using the method, and type and amount of adhesive as described in the explanation of the laminating step of FIG. 4. The laminated web structure is then mechanically softened by perf-embossing in the same manner as Example I. The resultant laminate wiper has the following characteristics:

|  | Before Softening | After Softening |
|---|---|---|
| Cross Direction Wet Tensile (ounces per inch) | 72.4 | 43.8 |
| Machine Direction Wet Tensile (ounces per inch) | — | 111.9 |
| Total Tear Test (gram-cm) | 458 | 358 |
| Mullen Burst Test, Dry (psi) | 29.5 | 26.6 |
| Flexural Rigidity | 772.6 | 380.2 |
| Taber Test, Dry (cycles) | 151 | 102 |
| Basis Weight (pounds per 2880 square feet) | 68.6 | 69.9 |

EXAMPLE V

The non-reinforced surface of the laminated structure of Example IV is, prior to perf-embossing, adhered to a second reinforcing layer of Cerex spunbonded nylon having a basis weight of 0.4 ounces per square yard and using a second laminating step substantially the same as the laminating step used to make Example IV. The laminated structure is then subjected to the same perf-embossing process that was used to soften Example IV. The resultant laminate wiper has the following characteristics:

|  | Before Softening | After Softening |
|---|---|---|
| Cross Direction Wet Tensile (ounces per inch) | 120.3 | 84.72 |
| Machine Direction Wet Tensile (ounces per inch) | — | 197.9 |
| Total Tear Test (gram-cm) | 883 | 742.4 |
| Mullen Burst Test, Dry (psi) | 54.1 | 45.9 |
| Flexural Rigidity | 2901 | 1846 |
| Taber Test, Dry (cycles) | 344 | 179 |
| Basis Weight (pounds per 2880 square feet) | 84.2 | 85.1 |

We claim:

1. A multi-layered wiper comprising:
   (a) a strong surface region of fibers having a predominate length of less than one-fourth inch and having bonding material disposed therein in a fine spaced apart pattern, the areas in the strong surface region where the bonding material is disposed being finely creped;
   (b) an inner core region of fibers having a predominate length of less than one-fourth inch and generally having less fiber concentration than the surface region;
   (c) a second strong region of fibers having a predominate length of less than one-fourth inch and having a greater fiber concentration than in the inner core region and having bonding material disposed therein in a fine spaced apart pattern to bond the fibers in the second strong region together into a strong network, the bonding material in the second strong region being substantially unconnected to the bonding material in the strong surface region and many of the fibers in the inner core region adjacent to the first strong surface region and the second strong region being tied into fibers in the first strong surface region or second strong region by either papermaking bonds or bonding material; and
   (d) a strengthening layer comprising a web of fibrous material having a minimum wet tensile strength of about 16 ounces per inch measured in any direction, and being substantially free of apertures larger than 0.02 square inches, said strengthening layer being bonded to the exterior surface of the second strong region.

2. A multi-layered wiper as recited in claim 1 further comprising:
   (a) a third strong region of fibers having a predominate length of less than one-fourth web and having bonding material disposed therein in a fine spaced apart pattern to bind the fibers in the third strong region together into a strong network,
   (b) a second inner core region of fibers having a predominate length of less than one-fourth ince and generally having less fiber concentration than the third strong region; and
   (c) a second strong surface region of fibers having a predominate length of less than one-fourth inch and having bonding material disposed therein in a fine spaced apart pattern, the areas in the strong surface region where the bonding material is disposed being finely creped, and the bonding material in the second strong surface region being generally unconnected to the bonding material in the third strong region of fibers, and many of the fibers in the second core region adjacent to the second strong surface region and the third strong region being tied into fibers in said second strong surface region or third strong region by either papermaking bonds or bonding material.

3. A multi-layered wiper as recited in claim 1 further comprising:
   (a) a second strengthening layer comprising a web of fibrous material having a minimum wet tensile strength of about 16 ounces per inch measured in any direction, and being substantially free of apertures larger than 0.02 square inches, said strengthening layer being bonded to the exterior surface of the first strong region.

4. A multi-layered wiper as recited in claim 1 wherein the bonding material in the surface of the second strong region adjacent the strengthening layer is finely creped.

5. A multi-layered wiper as recited in claims 1 or 4 wherein the bonding material in the external surface of the strong surface region occupies from about 15 to about 60 percent of the surface area of the wiper.

6. A multi-layered wiper as recited in claim 1 wherein the bonding material in the second strong region occupies from about 15 to about 60 percent of the surface area of the wiper.

7. A multi-layered wiper as recited in claim 5 wherein the bonding material in the second strong region occupies from about 15 to about 60 percent of the surface area of the wiper.

8. A multi-layered wiper as recited in claim 3 wherein the bonding material in the surface of the second strong region adjacent the strengthening layer is finely creped.

9. A multi-layered wiper as recited in claims 3 or 8 wherein the bonding material in the external surface of the strong surface region occupies from about 15 to about 60 percent of the surface area of the wiper.

10. A multi-layered wiper as recited in claim 3 wherein the bonding material in the second strong region occupies from about 15 to about 60 percent of the surface area of the wiper.

11. A multi-layered wiper as recited in claim 9 wherein the bonding material in the second strong region occupies from about 15 to about 60 percent of the surface area of the wiper.

12. A multi-layered wiper as recited in claim 2 wherein the bonding material in the surface of the second and third strong regions adjacent the strengthening layer is finely creped.

13. A multi-layered wiper as recited in claims 2 or 12 wherein the bonding material in the external surface of both strong surface regions occupies from about 15 to about 60 percent of the surface area of the wiper.

14. A multiple-layered wiper as recited in claim 2 wherein the bonding material in the second and third strong regions occupies from about 15 to about 60 percent of the surface area of the wiper.

15. A multiple-layered wiper as recited in claim 13 wherein the bonding material in the second and third strong regions occupies from about 15 to about 60 percent of the surface area of the wiper.

16. A method of making a multi-layered wiper comprising the steps of:
   (a) applying bonding material to one side of a web of fiber having a predominate length of less than one-fourth inch which penetrates from about 10 to about 60 percent through the web;
   (b) applying bonding material to the other side of the web in a fine, spaced apart pattern which covers about 15 to about 60 percent of the surface area and which penetrates to about 10 percent to about 60 percent through the thickness of the web and which does not substantially interconnect with the bonding material in the one side;
   (c) adhering the bonded portions of the other side of the web to a creping surface and creping the web from the creping surface; and
   (d) adhering a reinforcing web of fibrous material having a minimum wet tensile strength of about 16 ounces per inch measured in any direction and being substantially free of apertures larger than 0.02 square inches, to the surface of said one side of the web.

17. The method of making a multi-layered wiper as recited in claim 16 additionally comprising the step of adhering a second reinforcing web of fibrous material having a minimum wet tensile strength of about 16 ounces per inch measured in any direction and being substantially free of apertures larger than 0.02 square inches, to the surface of the other side of the web.

18. The method of making a multi-layered wiper as recited in claim 16 comprising the additional steps of:
   (a) repeating steps (a) (b) and (c) on a second web of fibers having a predominate length of less than one-fourth ince;
   (b) adhering said one side of the second web to the reinforcing web.

19. The method of making a multi-layered wiper as recited in claim 16 comprising the additional step of adhering the bonded portions of the one side of the web to a creping surface and creping the web from the creping surface.

20. The method of making a multi-layered wiper as recited in claim 16 or 19 comprising the additional step of mechanically softening the multi-layered wiper.

21. The method of making a multi-layered wiper as recited in claim 20 wherein the mechanically softening step is accomplished by perf-embossing the multi-layered wiper.

22. The method of making a multi-layered wiper as recited in claim 19 additionally comprising the step of adhering a second reinforcing web of fibrous material having a minimum wet tensile strength of about 16 ounces per inch measured in any direction and being substantially free of apertures larger than 0.02 square inches, to the surface of the other side of the web.

23. The method of making a multi-layered wiper as recited in claim 17 or 22 comprising the additional step of mechanically softening the multi-layered wiper.

24. The method of making a multi-layered wiper as recited in claim 23 wherein the mechanically softening step is accomplished by perf-embossing the multi-layered wiper.

25. The method of making a multi-layered wiper as recited in claim 19 comprising the additional steps of:
   (a) repeating steps (a), (b) and (c) on a second web of fibers having a predominate length of less than one-fourth inch;
   (b) adhering the bonded portions of the one side of the second web to a creping surface and creping the web from the creping surface; and
   (c) adhering said one side of the second web to the reinforcing web.

26. The method of making a multi-layered wiper as recited in claim 18 or 25 comprising the additional step of mechanically softening the multi-layered wiper.

27. The method of making a multi-layered wiper as recited in claim 21 wherein the mechanically softening step is accomplished by perf-embossing the multi-layered wiper.

* * * * *